Nov. 16, 1948.  D. H. CLAYPOOL  2,453,783
AUTOMATIC SHUTOFF FOR TRACTORS
Filed Oct. 7, 1947  2 Sheets-Sheet 1
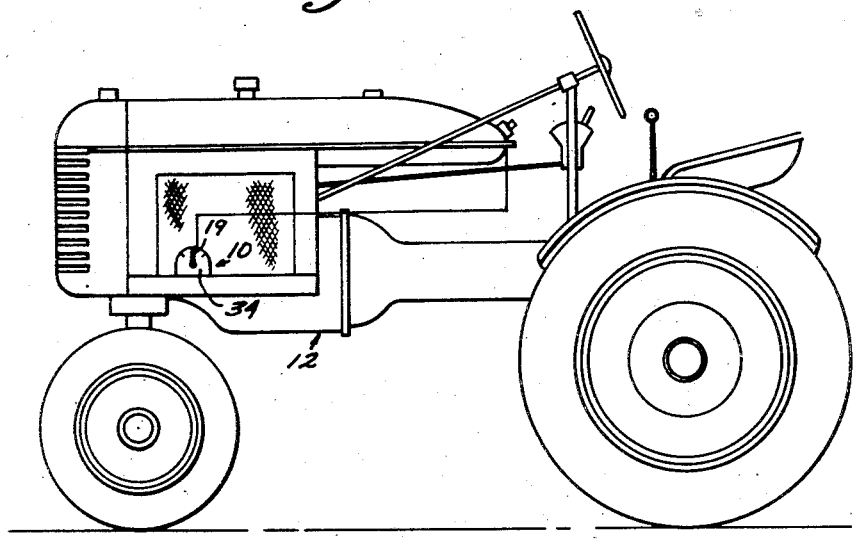
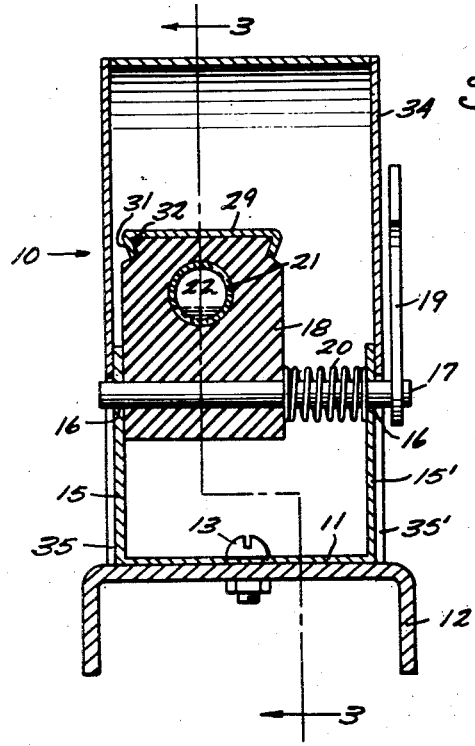
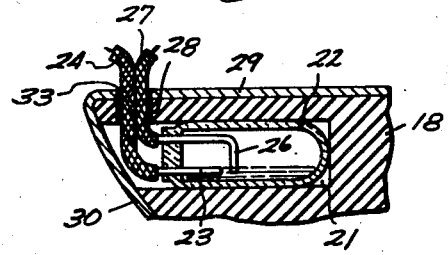
INVENTOR.
Don H. Claypool,
BY Victor J. Evans & Co.
ATTORNEYS

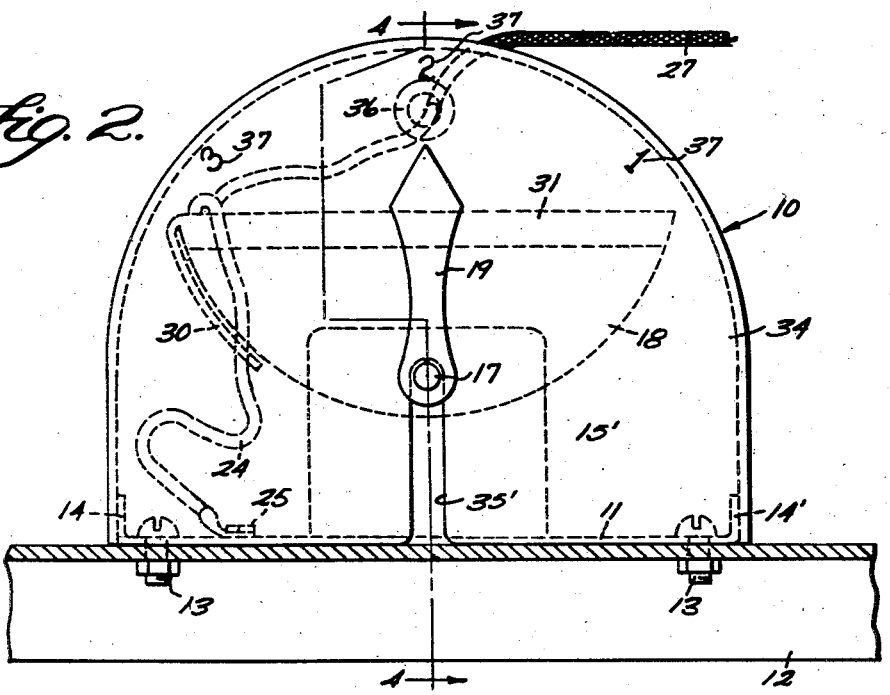
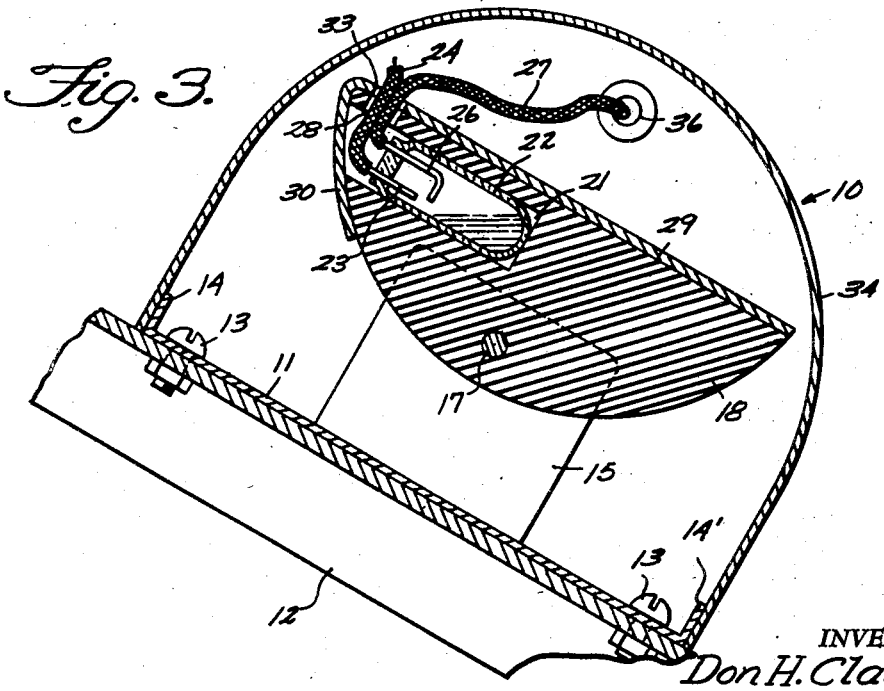

Patented Nov. 16, 1948

2,453,783

UNITED STATES PATENT OFFICE 2,453,783

AUTOMATIC SHUTOFF FOR TRACTORS

Don H. Claypool, Mansfield, Ohio

Application October 7, 1947, Serial No. 778,477

3 Claims. (Cl. 180—82)

This invention relates to an automatic stabilizer for tractors.

The main object of the invention is to provide a device that will automatically shut off or break the ignition circuit, and stop the engine. This action occurs when the front wheels of the tractor are raised to predetermined levels above the rear wheels of the tractor or when the front wheels of the tractor are raised from contact with the ground.

Another object of the invention is to provide a device of this character that can be controlled to shut off or break the ignition when the front wheels of the tractor are raised to predetermined heights above the ground level.

A further object of the invention is to provide a device of this character that is simple in construction, efficient in operation and durable in use.

With the above and other objects and advantages in view, the invention consists of the novel details of construction, arrangement and combination of parts more fully hereinafter described, claimed and illustrated in the accompanying drawings in which:

Figure 1 is a side elevational view of a tractor with an embodiment of the invention attached thereto;

Figure 2 is a side elevational view of the device per se, showing a portion of the tractor in section;

Figure 3 is a vertical sectional view of the device in position for stopping the engine of the tractor, and is on the line 3—3 of Figure 4;

Figure 4 is a sectional view on the line 4—4 of Figure 2 and

Figure 5 is a detailed sectional view of the device in position when the engine of the tractor is running.

Referring more in detail to the drawings, the reference numeral 10 generally designates the automatic shut-off embodying the invention.

The automatic shut-off 10 embodies the rectangular shaped base plate 11, which is secured to the tractor 12, as shown in Figure 1, by the means of fasteners 13.

The ends of the base plate 11 are bent upwardly at right angles to the plate 11 to form the cover attaching flanges 14 and 14' respectively. Centrally of the sides of the base plate 11, there is formed integrally therewith, the upstanding opposed and alined shaft supporting arms 15 and 15' respectively.

Each plate is provided with an opening 16, and the openings are in alinement with each other to rotatably journal the shaft 17 therein.

Fixed to the shaft 17, intermediate of the arms 15 and 15', is the arcuate shaped switch housing 18. The outer end of the shaft 17 has the arrow-shaped indicator 19 fixed thereon for the rotation of the shaft 17, as desired. A spring 20, sleeved on the shaft 17, intermediate of the housing 18 and the arm 15' exerts sufficient pressure on these elements to retain the housing 18 in any position to which it is moved by the arrow 19.

The housing 18, at one end thereof, is provided with a recess or cavity 21, in which is positioned the mercury switch 22 having the contact 23 connected by the wire 24 to the ground terminal 25. The lead 26 is connected to the ignition system of a tractor, not shown, by the wire 27.

The wires 24 and 27 pass through an opening 28 in the housing 18, to their various terminals. A plate 29 having an arcuate shaped end 30 is mounted on the housing 18 to retain the switch 22 in the recess 21. The plate 29 has the inclined edge flanges 31 engaging the grooves 32 in the sides of the housing to retain the plate in sliding relation on the housing 18. An opening 33 in the plate 29 alines with the opening 28 in the housing 18 to permit the passage of the wires 24 and 27 therethrough.

The housing is enclosed by the hollow semi-elliptical shaped housing 34, which is engaged at its bottom edges with the flanges 14 and 14'. These flanges retain the housing on the base plate 11, and vertical slots 35 and 35' respectively sleeve the shaft 17 to permit the housing to be so engaged.

The housing 34 is provided with an opening 36 for the passage therethrough of the wire 27 on its way to the ignition of the tractor.

Many and serious accidents have occurred to the operators of tractors when the front wheels of the tractor have raised out of engagement with the ground, turning the tractor over. This action of the tractor is caused by too heavy a drag on the rear end of the tractor or by the condition of the terrain over which the tractor is travelling.

The device, therefore, was designed to eliminate the hazard of the continuous rise of the tractor that is caused by the result of the rear wheels still revolving when the front wheels are raised from the ground.

Before starting the tractor, the arrow 19 is directed toward one of the indicia 37 placed on the outer surface of the housing 34. The indicia are so positioned that a slight rise of the wheels above normal breaks the circuit and shuts off the engine.

The normality of the tractor level is determined by the rise of the terrain over which the tractor is travelling. If the ground is level, the indicia are adjusted for such terrain. At greater slants of the terrain, the arrow is further adjusted so that the device will only break the circuit when the front wheels leave the ground. Due to the spring 20, the housing 10 will not swing by gravital action, but will only swing when it is moved by the arm 19.

Thus the arrow is set so that the ignition will be cut off at predetermined levels when the front wheels of the tractor are raised from the ground.

It is believed that the operation and construction of the device will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. An automatic shut-off for tractors adapted to be connected to the tractor in the rear of the forward wheels thereof, comprising a base plate, supporting means on the base plate, a shaft journalled in the supporting means, a housing fixed to the shaft, a disconnecting means carried by said housing adapted to stop the engine of the tractor when the front wheels thereof raise from the ground, and means for setting the housing so that the disconnecting means will operate at predetermined levels.

2. The invention as in claim 1, wherein a housing for the first mentioned housing is removably connected to said base plate.

3. The invention as in claim 1, wherein the first mentioned housing is arcuate shaped in cross section, and the means for stopping the engine comprises a mercury switch mounted in said housing.

DON H. CLAYPOOL.

No references cited.